W. Y. DONAHOE.
MOTOR VEHICLE.
APPLICATION FILED NOV. 19, 1907.

904,687.

Patented Nov. 24, 1908.

Witnesses

Inventor
William Y. Donahoe,
By Joseph C. Stack.
his Attorney

UNITED STATES PATENT OFFICE.

WILLIAM Y. DONAHOE, OF CASCADE, IOWA.

MOTOR-VEHICLE.

No. 904,687.　　　　　Specification of Letters Patent.　　　Patented Nov. 24, 1908.

Application filed November 19, 1907.　Serial No. 402,836.

*To all whom it may concern:*

Be it known that I, WILLIAM Y. DONA-HOE, a citizen of the United States, residing at Cascade, in the county of Dubuque and State of Iowa, have invented certain new and useful Improvements in Motor-Vehicles, of which the following is a specification.

My invention relates to motor-vehicles; and it is especially applicable to use in the mounting and carrying of field ordnance.

The principal objects of my invention are to provide improved clutch-controlled means for transmitting motive power to the traction-wheels, whereby their direction of rotation may be reversed, or either may be disconnected from the motive power to cause the turning of the vehicle by the continued actuation of the other traction-wheel; and to provide a protecting armor for the vehicle.

In the following description and claims, and in the accompanying drawing, I have shown a preferred embodiment of my invention for accomplishing the foregoing and hereinafter indicated objects. I however reserve the right to make any modifications thereto that fall within the scope of my invention.

Figure 1:
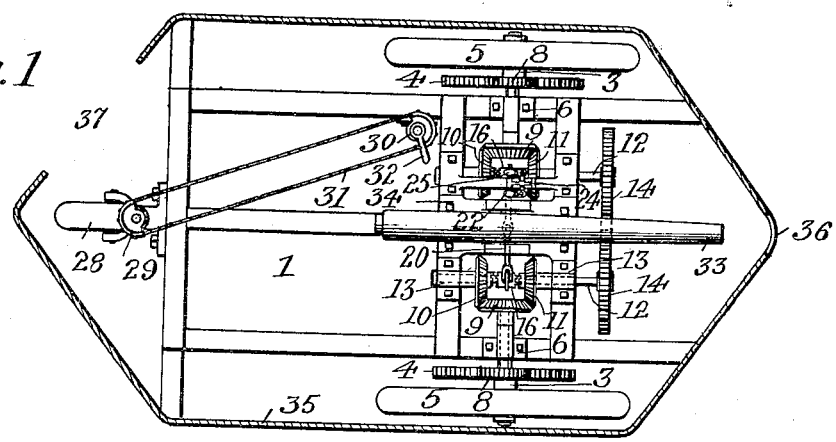
Figure 2:
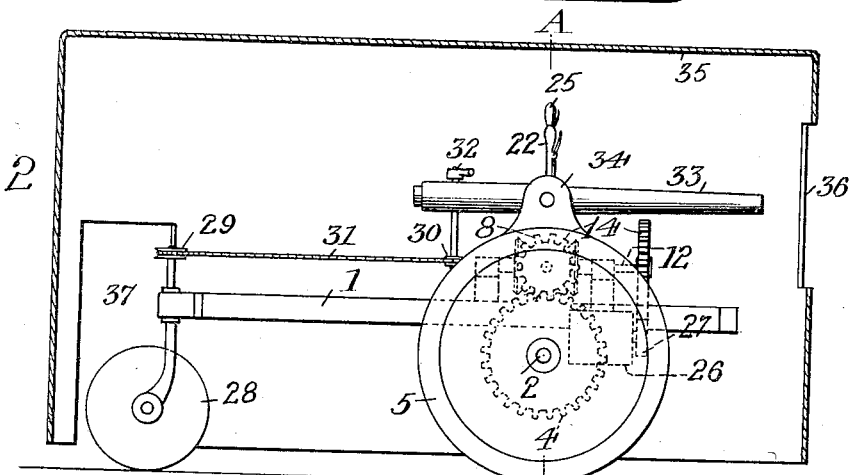
Figure 3:
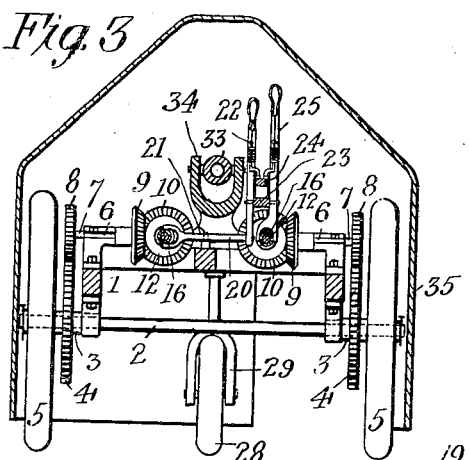
Figure 4:
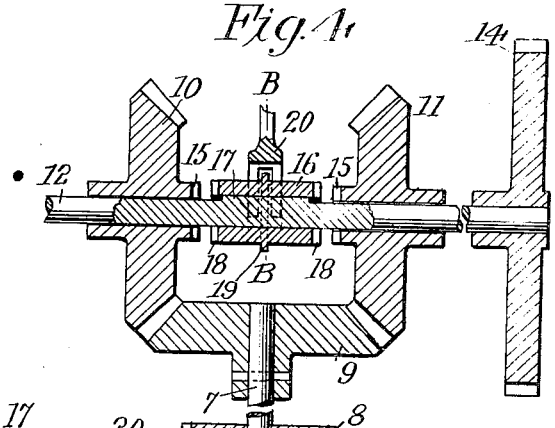
Figure 5:
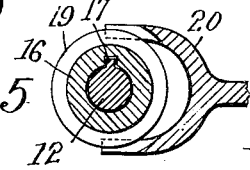

In the drawing—Figure 1 is a plan view of my invention, the armor being shown in section. Fig. 2 is a side elevation, the armor being shown in section. Fig. 3 is a vertical transverse section on the line A—A of Fig. 2. Fig. 4 is an enlarged section of the clutch-controlled means for transmitting motive power to a traction-wheel. Fig. 5 is an enlarged section on the line B—B of Fig. 4.

1 indicates the frame of the vehicle, and 2 an axle secured thereto in any suitable manner to prevent the rotation of the axle. Upon the opposite ends of the axle 2, are rotatably mounted sleeves 3, each having rigidly fixed thereto a gear 4 and a traction-wheel 5. The sleeves 3 are positioned upon the axle and retained thereon in any suitable manner.

Above the axle 2, and secured to the vehicle frame by suitable boxes 6, are shafts 7, one being disposed at each side of the machine. Each shaft 7 has rigidly secured to its outer end a spur-gear 8, and to its inner end is rigidly secured a bevel gear 9; the spur-gear 8 being in mesh with the gear 4.

A pair of bevel gears, 10 and 11, are loosely mounted on a rotatable shaft 12, and are maintained, in any suitable manner, in constant mesh with the corresponding bevel gear 9 at opposite diametrical points thereof.

The shafts 12 are mounted in suitable boxes 13, secured to the frame of the vehicle: and each shaft has rigidly secured to its front end a spur-gear 14, the gears 14 being in mesh with each other.

The bevel gears 10 and 11 have each a hub provided with a clutch-face, toothed as at 15, for engagement with a correspondingly toothed end of a clutch-sleeve 16, mounted to slide on shaft 12, between the clutch-faced hubs of the bevel gears 10 and 11 thereon. Each clutch-sleeve 16 is mounted to slide longitudinally of its shaft 12, preferably by means of a spline 17, which also causes the clutch-sleeve to rotate with the shaft. The teeth at the opposite ends of the clutch-sleeves are indicated at 18.

The clutch-sleeves 16 are each provided with an annular flange 19. This flange 19 of one sleeve 16, is engaged by the slotted bifurcated end of a lever 20, pivoted at 21 to the vehicle frame, the opposite end of the lever being operatively connected to the lower end of a hand-lever 22, pivoted to a frame 23, having a toothed segment 24, which is engaged in the usual manner by a hand-controlled spring-pressed dog carried by the hand-lever 22. The other clutch-sleeve 16 has its annular flange 19 engaged by the slotted bifurcated end of a hand-lever 25, provided, as is the lever 22, with a spring-actuated dog to engage the toothed segment 24.

A motor 26, of any suitable type, actuates one of the gears 14: in the drawing a spur-gear 27, driven by the motor, is shown in mesh with a gear 14.

In the rear portion of the frame is pivotally mounted a trail-wheel 28, having a segment 29 fixed to the upper end of the fork carrying the trail-wheel. A similar segment 30 is suitably mounted on the frame in a position convenient to the operator, and a chain 31, connects the two segments and transmits motion from segment 30 to the trail-wheel, whenever the operator turns the former by means of a crank-handle 32, fixed to the shaft of segment 30. The segments are preferably toothed to more positively engage the chain.

A gun 33 is suitably mounted in a frame 34, secured to the frame of the vehicle.

A protecting armor 35 is suitably supported by the frame 1; and this armor is provided at its forward end with a firing opening 36, and at the rear it may be provided with an entrance and exit opening 37.

The operation of my device is as follows: Assuming the motor 26 to be in operation to rotate the shafts 12, and the clutch-sleeves 16 to have been shifted to engage corresponding bevel gears, the gears 10 for example, the vehicle will then move straight ahead. If it be desired to turn to either the right or left, the clutch-sleeve 16, on the side towards which it is desired to turn, is shifted into the middle position, disengaged from both gears 10 and 11, and the traction-wheel controlled by the shifted sleeve thereupon ceases to be driven, and the other traction-wheel, continuing to be driven, carries the vehicle around in the desired direction. The trail-wheel may be turned by the operator in accordance with the turning of the vehicle.

It will of course be understood that the vehicle may be driven forward or backward, dependent upon which of the bevel gears 10 or 11 are engaged by the clutch-sleeves.

Having thus described my invention, what I claim is—

1. In a motor vehicle, the combination with oppositely disposed traction-wheels, of a gear fixed to each traction-wheel, a separate driving mechanism for each traction-wheel, comprising a shaft, power transmitting means connecting the shaft to the gear on the traction-wheel, a gear on the shaft, gears disposed at opposite sides of the gear on the shaft and adaptable to actuate said gear in either direction, and clutch-controlled means adapted to transmit power to either of the oppositely disposed gears or to discontinue the transmission of power to either or both of said gears, and means for simultaneously imparting motion to each clutch-controlled means.

2. In a motor-vehicle, the combination with oppositely disposed traction-wheels, of a spur-gear fixed to each, separate driving mechanism for each traction-wheel, comprising a shaft, a pair of bevel gears loosely mounted thereon, a clutch-sleeve mounted to slide upon the shaft but connected thereto to rotate therewith and adapted to engage either bevel gear or disengage from both, a second shaft, and a gear fixed to each end thereof the bevel gear on one end meshing with the pair of loosely mounted bevel gears and the gear on the other end meshing with the spur-gear fixed to the traction-wheel, and means for simultaneously imparting motion to each clutch-bearing shaft.

3. In a motor-vehicle, the combination with oppositely disposed traction-wheels mounted on the frame of the vehicle, of a spur-gear fixed to each traction-wheel, separate driving mechanism for each traction-wheel, comprising a shaft, a pair of bevel gears loosely mounted thereon, a clutch-sleeve mounted on the shaft intermediate the bevel gears the clutch sliding upon the shaft but rotating therewith and being adapted to engage either bevel gear or to be disconnected from both, a second shaft, and a spur-gear and a bevel gear fixed to opposite ends thereof the bevel gear meshing with the pair of loosely mounted bevel gears and the spur-gear meshing with the spur-gear of the traction-wheel, intermeshing gears on the separate clutch-bearing shafts, means for independently operating each clutch, means for imparting motion to one of the intermeshing gears of the clutch-bearing shafts, a trail-wheel rotatably mounted to the frame of the vehicle, and means for turning the trail-wheel.

In testimony whereof I affix my signature in presence of two witnesses.

WILLIAM Y. DONAHOE.

Witnesses:
J. B. SKAHILL,
J. J. FAGAN.